(12) United States Patent
Armano et al.

(10) Patent No.: US 10,794,049 B2
(45) Date of Patent: Oct. 6, 2020

(54) FLUID MANAGEMENT/CONTROL SYSTEM

(71) Applicant: ENASI Industries Inc., Chateauguay (CA)

(72) Inventors: Sergio Armano, St-Chrysostome (CA); Igor Armano, St-Chrysostome (CA)

(73) Assignee: ENASI Industries Inc., Chateauguay (CA)

( * ) Notice: Subject to any disclaimer, the term of this patent is extended or adjusted under 35 U.S.C. 154(b) by 0 days.

(21) Appl. No.: 15/878,567

(22) Filed: Jan. 24, 2018

(65) Prior Publication Data

US 2019/0226183 A1 Jul. 25, 2019

(51) Int. Cl.
*E03B 7/07* (2006.01)
*G05D 7/06* (2006.01)

(52) U.S. Cl.
CPC .............. *E03B 7/071* (2013.01); *E03B 7/078* (2013.01); *G05D 7/0641* (2013.01); *Y02A 20/15* (2018.01)

(58) Field of Classification Search
CPC .......... E03B 7/071; E03B 7/078; Y02A 20/15
See application file for complete search history.

(56) References Cited

U.S. PATENT DOCUMENTS

| | | | |
|---|---|---|---|
| 1,702,930 A | 2/1929 | Chandler | |
| 4,249,565 A * | 2/1981 | Brust | F16K 31/00 137/487.5 |
| 4,589,435 A * | 5/1986 | Aldrich | F16K 21/16 137/102 |
| 5,004,014 A * | 4/1991 | Bender | E03B 7/071 137/624.12 |
| 5,205,318 A | 4/1993 | Massaro et al. | |
| 5,347,264 A * | 9/1994 | Bjorkman | F17D 5/00 340/611 |
| 5,568,825 A * | 10/1996 | Faulk | E03B 7/071 137/624.11 |
| 6,209,576 B1 * | 4/2001 | Davis | E03B 7/071 137/487.5 |
| 6,216,727 B1 * | 4/2001 | Genova | F17D 5/02 137/460 |
| 6,237,618 B1 * | 5/2001 | Kushner | E03B 7/071 137/1 |

(Continued)

FOREIGN PATENT DOCUMENTS

| | | |
|---|---|---|
| CN | 201508483 | 6/2010 |
| DE | 102009045150 | 6/2011 |

(Continued)

*Primary Examiner* — David Colon-Morales
(74) *Attorney, Agent, or Firm* — Carmody Torrance Sandak & Hennessey LLP

(57) ABSTRACT

A system for monitoring and controlling a flow of fluid in an environment and a method of using the system to control the flow of fluid in the environment. The system comprises a main valve positioned at an entry point of the environment. The main valve permits fluid to be discharged into the environment upon receipt of an authorized request to a controller from one or more authorizing signaling devices. The controller communicates with the authorizing devices and processes signals from the authorizing signaling device to control the flow of fluid in the environment. The system may also comprise one or more monitoring signaling devices positioned in the environment intermediate the main valve and an authorizing signaling device.

15 Claims, 8 Drawing Sheets

(56) References Cited

U.S. PATENT DOCUMENTS

| | | | |
|---|---|---|---|
| 6,432,300 B2 | 8/2002 | Larkner et al. | |
| 6,491,062 B1* | 12/2002 | Croft | F17D 5/06 |
| | | | 137/624.11 |
| 6,543,479 B2* | 4/2003 | Coffey | E03B 7/071 |
| | | | 137/624.11 |
| 6,766,835 B1 | 7/2004 | Fima | |
| 6,914,531 B1* | 7/2005 | Young | A62C 35/68 |
| | | | 340/606 |
| 7,114,516 B2 | 10/2006 | Ito | |
| 7,225,056 B2 | 5/2007 | Bolduan | |
| 7,306,008 B2* | 12/2007 | Tornay | F17D 5/06 |
| | | | 137/460 |
| RE40,310 E | 5/2008 | Larkner | |
| 8,887,756 B2 | 11/2014 | Powell | |
| 9,081,389 B2 | 7/2015 | Foster | |
| 9,109,349 B1* | 8/2015 | Minton, Jr. | E03B 7/071 |
| 9,232,768 B2 | 1/2016 | Knurr et al. | |
| 9,297,150 B2* | 3/2016 | Klicpera | E03B 7/071 |
| 9,366,582 B2* | 6/2016 | Rosca | G01F 1/00 |
| 9,523,978 B2 | 12/2016 | Lichtash | |
| 9,690,303 B1 | 6/2017 | Minton, Jr. | |
| 9,938,698 B2* | 4/2018 | Guy | E03B 7/071 |
| 2001/0032674 A1* | 10/2001 | Brunet | F17D 3/01 |
| | | | 137/487.5 |
| 2002/0002425 A1* | 1/2002 | Dossey | G01F 1/44 |
| | | | 700/284 |
| 2002/0088491 A1* | 7/2002 | Yanagisawa | G01M 3/2807 |
| | | | 137/456 |
| 2004/0226614 A1* | 11/2004 | Lane | E03B 7/071 |
| | | | 137/487.5 |
| 2005/0192710 A1 | 9/2005 | Thornton et al. | |
| 2006/0069453 A1* | 3/2006 | DeBourke | E03C 1/041 |
| | | | 700/19 |
| 2009/0194719 A1* | 8/2009 | Mulligan | E03B 7/071 |
| | | | 251/129.01 |
| 2010/0307600 A1* | 12/2010 | Crucs | E03B 7/071 |
| | | | 137/2 |
| 2011/0114202 A1* | 5/2011 | Goseco | E03B 7/04 |
| | | | 137/487.5 |
| 2013/0248023 A1* | 9/2013 | Estrada, Jr. | E03B 7/071 |
| | | | 137/551 |
| 2014/0224340 A1 | 8/2014 | Klee et al. | |
| 2014/0245208 A1 | 8/2014 | Javey et al. | |
| 2014/0343736 A1* | 11/2014 | Meyer | G01M 3/18 |
| | | | 700/283 |
| 2015/0268670 A1 | 9/2015 | Nies et al. | |
| 2015/0376874 A1 | 12/2015 | Breedlove | |
| 2016/0041565 A1 | 2/2016 | Edwards | |
| 2016/0076909 A1 | 3/2016 | Kliepera | |
| 2016/0123484 A1 | 5/2016 | Mori et al. | |
| 2016/0349140 A1 | 12/2016 | Teymouri | |
| 2016/0376773 A1 | 12/2016 | Abuhamdeh et al. | |
| 2017/0009432 A1 | 1/2017 | Lapointe et al. | |
| 2017/0016214 A1* | 1/2017 | Ravid | E03B 7/071 |
| 2017/0023434 A1 | 1/2017 | Jerez | |
| 2017/0030528 A1* | 2/2017 | Dietzen | F17D 5/06 |
| 2017/0152648 A1* | 6/2017 | Hammond | G01F 1/667 |
| 2017/0285665 A1* | 10/2017 | Nunally | E03B 7/071 |
| 2017/0370754 A1 | 12/2017 | Croteau | |

FOREIGN PATENT DOCUMENTS

| | | |
|---|---|---|
| GB | 2454465 | 5/2009 |
| TW | 322564 | 11/2007 |
| WO | WO99/40351 | 8/1999 |
| WO | WO2015/136522 | 9/2015 |
| WO | WO2016/034734 | 3/2016 |

* cited by examiner

FLUID MANAGEMENT/CONTROL SYSTEM

FIELD OF THE INVENTION

The present invention relates generally to a fluid management system for managing the flow of fluid into and within an environment.

BACKGROUND OF THE INVENTION

The control of the flow of fluid into and within an environment is desirable to prevent unauthorized flow of fluid and to minimize leaks within the environment.

For example, water leaks in homes and businesses can cause major damage to a structure and be extremely costly. Leaks can occur in numerous places through a home or office, often in locations that are inaccessible or undetectable by an occupant. In addition, such leaks may also occur when the home or business is unoccupied for any period of time or due to extreme temperature conditions. Such leaks can cause significant damage even if discovered quickly, and even more significant damage if the leak exists for a period of time.

Pipes are typically connected to a main water supply line and are maintained under constant pressure. In a conventional arrangement, pipes maintain a full volume of water within the plumbing, even when there is no need for water by a user. As a result, any leak that develops has the potential to release the full volume of water held by the system, even if the water supply is cut off. Even more likely, if the leak is not detected immediately, water can continue to release out of the system, causing extensive damage.

U.S. Pat. No. 9,690,303 to Minton, Jr. describes an electronic water management system that utilizes wireless transmitters in communication with electronic valves at a manifold to restrict the flow of unnecessary water into a structure to limit damage from leaks. The system includes a manifold with first and second electronic valves that is connected to the main water supply and feeds a connection line which provides water to the structure. The system includes a requesting member such as a faucet with a flow sensor attached to the connection line and an activation member such as a handle with a transmitter posted nearby. When water is requested, the handle is turned, and the transmitter communicates with the first electronic valve to allow water to flow from the main water supply through the manifold and connection line, where it exits the faucet. However, this system does not distinguish between an authorized and an unauthorized demand for water.

U.S. Pat. Pub. No. 2016/0376773 to Abuhamdeh describes a method for automatic water leak detection and mitigation of residential and commercial water supply systems that includes the use of three electronically controlled valves controlled by a valve controlled to enable valves to shut off the main water supply, open a drain path for existing water to escape, and open a venting valve to facilitate drainage. The three valves are installed to facilitate drainage by either syphoning the water out of the system or using gravity to force the water out of the system. However, this system is only designed to mitigate damage after it has occurred, and the system does not monitor current conditions to mitigate leaks or the potential for leaks prior to their occurrence.

U.S. Pat. No. 7,114,516 to Ito describes a leak-detecting check valve that has a function of detecting movement of a valve element of the leak-detecting check valve when the check valve is attached to a water supply or other conduit for water and actuating an alarm when a leak is detected. However, the leak-detecting check valve does not provide any authorization for water but rather only monitors the system to prevent leaks in the system.

It would be desirable to provide a system of valves within an environment to manage and control the flow of fluid within that environment. In addition, it would also be desirable to provide a system that can provide information regarding changes on conditions within the system to identify leaks/breaks in the system.

SUMMARY OF THE INVENTION

It is an object of the present invention to control the supply of fluid in an environment.

It is another object of the present invention to detect and identify any leaks in the environment.

It is another object of the present invention to detect and identify the specific location of a potential leak/break that may be developing within the environment.

It is still another object of the present invention to provide for the flow of fluid within an environment only upon a request for fluid from an authorized source.

In one embodiment, the present invention relates generally to a system for monitoring and controlling a flow of fluid in an environment and a method of using the system to control the flow of fluid in the environment.

In a preferred embodiment of the invention, the system comprises:

a) a main valve positioned at an entry point of the environment, wherein the main valve permits fluid to be discharged into the environment upon receipt of an authorizing signal thereto;

b) one or more authorizing signaling devices, wherein each authorizing signaling device (i) is associated with a respective outlet tap or valve from which fluid can be requested, (ii) is positioned intermediate the main valve and the respective outlet with which it is associated, and (iii) has a unique identifier associated therewith, wherein each authorizing signaling device is in fluid communication with the main valve;

c) a controller in communication with each of the authorizing signaling devices, wherein each of the authorizing signaling devices can request authorization from the controller to discharge of fluid to the respective outlet tap or valve with which it is associated;

d) a supply network of one or more lines, tubes, and/or pipes in the environment, wherein the supply network of one or more lines, tubes and/or pipes permit the flow of fluid through the main valve through the at least one or more of the authorizing signaling devices and to each outlet associated with the one or more authorizing signaling devices;

wherein the controller receives an authorization request from the authorizing signaling device, determines whether the requested authorization from the authorizing device is an authorized request, and provides the authorizing signal to the main valve to permit the flow of fluid through the main valve upon a determination by the controller that the authorization request from the authorizing signaling device is an authorized request.

In another preferred embodiment, the system described herein comprise at least one monitoring signaling device positioned within the supply network of one or more lines, tubes and/or pipes and intermediate the main valve and an authorizing signaling device, wherein the fluid flows through the main valve, the at least one monitoring signaling device and the authorizing signaling device;

wherein the at least one monitoring signaling device has a unique identifier associated therewith and comprises a sensor for monitoring a process condition associated therewith, wherein the at least one monitoring signaling device is in fluid communication with the main valve, and wherein the receipt of a signal from the at least one monitoring signaling device to the controller provides information to the controller regarding the process condition being monitored.

BRIEF DESCRIPTION OF THE FIGURES

For a fuller understanding of the invention, reference is made to the following description taken in connection with the accompanying figures, in which.

Also, while not all elements may be labeled in each figure, all elements with the same reference number indicate similar or identical parts.

DETAILED DESCRIPTION OF THE PREFERRED EMBODIMENTS

Figure 1:
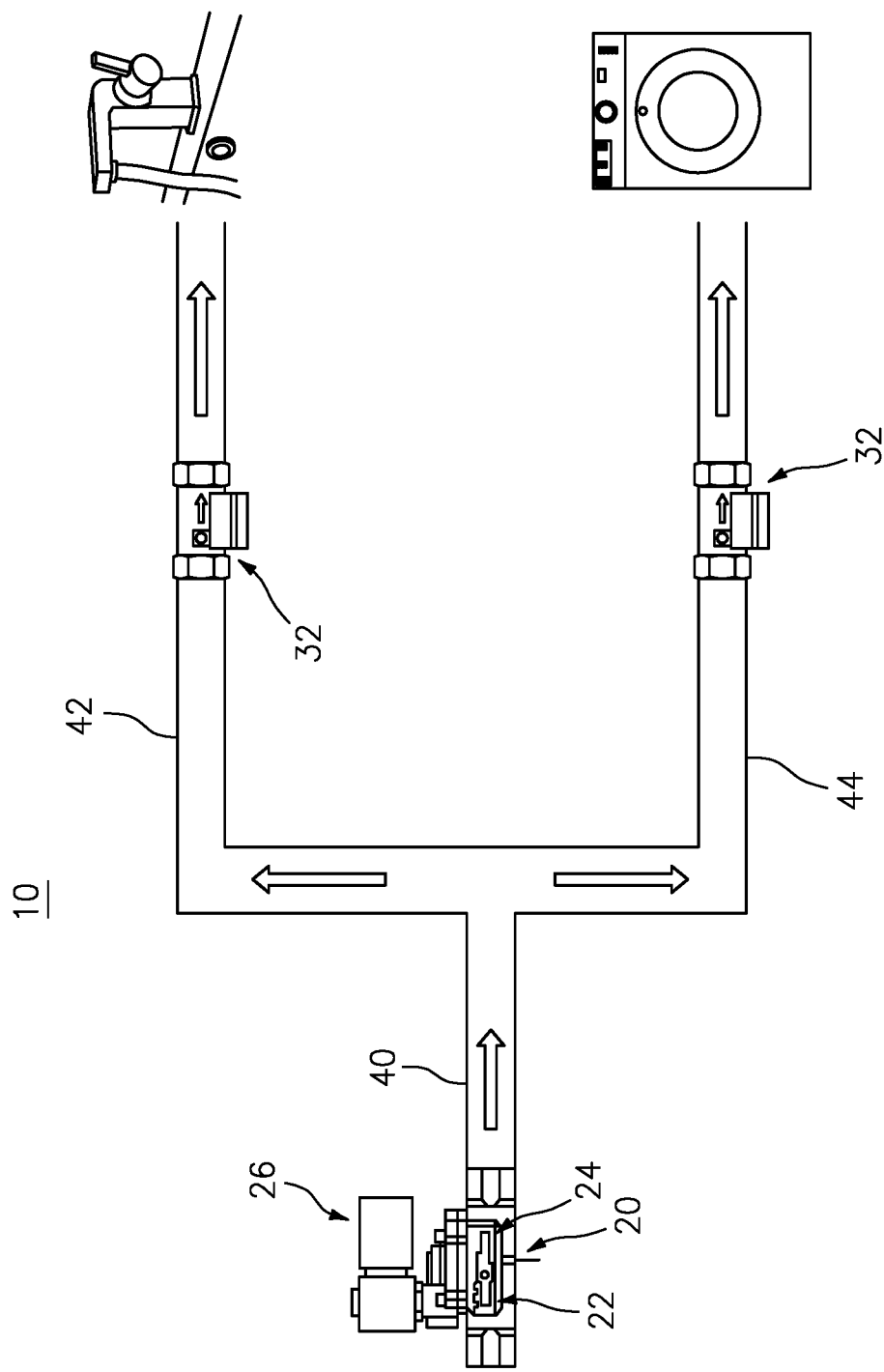
FIG. 1 depicts a diagram of a fluid supply system in accordance a preferred embodiment of the present invention.

The present invention is directed to a system and a method for controlling the supply of fluid to and within an environment, which may be for example, residential housing, condominium, commercial and/or industrial building or any other defined environment. The invention described herein detects the possibility of substantially any leak within the environment, whether accidental or otherwise.

The present invention also identifies unauthorized fluid demands which develop within the system and the specific area from which these unauthorized fluid demands originate within the system. Thus, using the method and the system described herein, it is possible to facilitate troubleshooting of potential leaks or other unauthorized fluid demands within the system to find the source of the potential leak or other unauthorized fluid demand and repair or correct as may be needed.

As used herein, "a," "an," and "the" refer to both singular and plural referents unless the context clearly dictates otherwise.

As used herein, the term "about" refers to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform in the invention described herein. Furthermore, it is also to be understood that the value to which the modifier "about" refers is itself specifically disclosed herein.

As used herein, spatially relative terms, such as "beneath", "below", "lower", "above", "upper", "front", "back", and the like, are used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. It is further understood that the terms "front" and "back" are not intended to be limiting and are intended to be interchangeable where appropriate.

As used herein, the terms "comprises" and/or "comprising," specify the presence of stated features, integers, steps, operations, elements, and/or components, but do not preclude the presence or addition of one or more other features, integers, steps, operations, elements, components, and/or groups thereof.

As used herein, the term "main valve" refers to a valve positioned at an entry to an environment through which a fluid may enter the environment.

As used herein, the term "check valve" or "one-way valve" refers to a two-port valve that allows a fluid to flow in only one direction. Check valves may be spring loaded, which substantially eliminates the effect of gravity on check valve function. Without a spring, gravity and thus the valve's vertical orientation can become a critical factor for proper working of the check valve.

As used herein, the term "environment" refers to a single family residential dwelling unit, a multi-family residential dwelling unit, a condominium or townhouse, a municipal building, a commercial building, or other similar locale in which fluid is supplied through a plurality of one or more lines, tubes, and/or pipes to associated outlet valves or taps.

As used herein, the term "cracking pressure" refers to the minimum upstream pressure when a normally closed check valve begins to open, and flow starts.

As used herein, the term "network" refers to an arrangement of one or more lines, tubes, and/or pipes within the environment for transporting a fluid within the environment.

As used herein, the term "entry point" refers to a point or location at which a fluid is capable of entering the environment.

As used herein, the term "source" refers to a monitored location within the environment and in which a signaling device that is capable of sending/receiving a signal from the main valve is located.

As used herein, the term "authorized source" refers to an outlet tap or valve that is monitored by an authorizing signaling device.

As used herein, the term "unauthorized source" refers to a monitored location of a monitoring signaling device.

As used herein, the term "abnormal use" refers to a use that is not authorized and that does not result from a request for fluid from an authorizing signaling device.

As used herein, the term "fluid" refers to any liquid, gas or other substance that flows or deforms under an applied shear stress. Examples of fluid include, but are not limited to water, wastewater, solvents, natural gas, etc.

As used herein, the term "authorized fluid request" refers to a request for fluid from an authorizing signaling device.

The system of the present invention uses a main valve, which in one embodiment may be a diaphragm valve, at an entry point of an environment. This main valve remains in a closed position unless and until there is an authorized request for fluid to a controller from an authorized/authorizing sources. The system described herein is capable of controlling substantially all of the supply of a fluid into and within an environment and monitoring the environment to detect and isolate possible leaks within the environment.

The main valve distributes fluid to a network of supply lines, tubes, and/or pipes, which in turn are connected to a number of outlet taps or valves to perform specific services (i.e., sink, shower, toilet, washer, etc.). These outlet taps or valves receive their fluid through the network of one or more lines, tubes and/or pipes and through authorizing signaling devices. Each authorizing signaling device exhibits a unique identifier and is connected to a respective outlet tap or valve and to an associated supply line.

In addition, optionally, but preferably the system also comprises monitoring signaling devices, where each monitoring signaling device also exhibits a unique identifier. In a preferred embodiment, the unique identifier is a RF signal code. Other unique identifiers that can be used include, for example, a local area network that uses radio waves to connect devices to the Internet (i.e., Wi-Fi) and other similar manners of supplying a unique identifier within a system.

The controller is programmed to receive signals and process signals from the main valve, from the optional monitoring signaling devices, and from the authorizing signaling devices, to recognize the unique identifier of each optional monitoring signaling device and each authorizing signaling device check valve and determine if the signal is an authorized signal or an unauthorized signal. Upon a determination that a signal is an authorized signal, the controller will provide an authorizing signal to the main valve to permit the flow of fluid through the main valve upon a determination by the controller that the authorization request from the authorizing signaling device is an authorized request. If the signal is unauthorized, the main valve will remain closed and the controller will issue a warning signal, which may be sent to a control panel or other pre-determined entity. This warning signal is an alert that something in the supply system is requesting fluid outside the registered authorizing signaling devices, indicating a potential development of a leak or break within the environment.

In one preferred embodiment, the present invention relates generally to a system for monitoring and controlling a flow of fluid in an environment, the system comprising:

a) a main valve positioned at an entry point of the environment, wherein the main valve permits fluid to be discharged into the environment upon receipt of an authorizing signal thereto;

b) one or more authorizing signaling devices, wherein each authorizing signaling device (i) is associated with a respective outlet tap or valve from which fluid can be requested, (ii) is positioned intermediate the main valve and the respective outlet with which it is associated, and (iii) has a unique identifier associated therewith, wherein each authorizing signaling device is in fluid communication with the main valve;

c) a controller in communication with each of the authorizing signaling devices, wherein each of the authorizing signaling devices can request authorization from the controller to discharge of fluid to the respective outlet tap or valve with which it is associated;

d) a supply network of one or more lines, tubes, and/or pipes in the environment, wherein the supply network of one or more lines, tubes and/or pipes permit the flow of fluid through the main valve through the at least one or more of the authorizing signaling devices and to each outlet associated with the one or more authorizing signaling devices;

wherein the controller receives an authorization request from the authorizing signaling device, determines whether the requested authorization from the authorizing device is an authorized request, and provides the authorizing signal to the main valve to permit the flow of fluid through the main valve upon a determination by the controller that the authorization request from the authorizing signaling device is an authorized request.

In another preferred embodiment, the system described herein comprises at least one monitoring signaling device positioned within the supply network of one or more lines, tubes and/or pipes and intermediate the main valve and an authorizing signaling device, wherein the fluid flows through the main valve, the at least one monitoring signaling device and the authorizing signaling device;

wherein the at least one monitoring signaling device has a unique identifier associated therewith and comprises a sensor for monitoring a process condition associated therewith, wherein the at least one monitoring signaling device is in fluid communication with the main valve, and wherein the receipt of a signal from the at least one monitoring signaling device to the controller provides information to the controller regarding the process condition being monitored.

In one embodiment, the main valve is a diaphragm valve and has associated therewith a controller that is programmed to evaluate fluid use in the environment and to distinguish between an authorized fluid request, in which the main valve is opened to allow fluid into the environment, and an unauthorized request, in which the main valve does not open, and fluid is not allowed into the environment. While the inventors of the present invention have determined that a diaphragm valve is suitable for use as the main valve, other valves that are capable of being programed to monitor specific data, compute specific data and to take specific action with respect to the monitoring signaling devices and the authorizing signaling devices would also be usable in the present invention. The controller may be programmed and controlled locally or remotely, depending on the needs of the user. In one preferred embodiment, the controller and the main valve are integrated into a programmable main valve assembly. In another preferred embodiment, the controller and the main valve may be physically separate assemblies. In another preferred embodiment, the controller is located remotely from the main valve.

As described herein, the supply network optionally contains monitoring signaling devices and contains one or more authorizing signaling devices. Preferably, the system contains at least one monitoring signaling device and one or more authorizing signaling devices.

The monitoring signaling devices are installed at selected points within the supply network. In one embodiment, the monitoring signaling devices may be installed at the start of a specific section of the supply line, such as a service specific area within a defined environment (i.e., laboratory, washroom, kitchen, etc.) or in a multi-unit or multi-use dwelling may be installed on specific sections of the supply network going to each independent unit or use. Furthermore, in a large supply network, it may be desirable to have monitoring signaling devices positioned at various junctions in the supply network to more closely monitor potential issues within the system. A combination of more environments in a larger system is also contemplated by the present invention.

The authorizing signaling devices are each associated with a respective outlet tap or valve and are installed adjacent to the respective outlet tap or valve. Thus, when a respective authorizing outlet tap or valve makes a request for fluid, the respective authorizing signaling device communicates with the controller to authorize discharge of fluid to the respective outlet tap or valve.

In one preferred embodiment, one or more of the monitoring signaling devices and/or one or more of the authorizing signaling devices may comprise check valves. However, the signaling devices are not limited to check valves and thus the signaling device may be any device that is capable of providing a unique identifier to the controller. Thus, the signaling device may comprise a flow sensor, an RF switch, a linked "smart" device (i.e., a smart faucet, washer, other appliance, etc.), or any other device that contains a unique identifier that can communicate with the programmable main valve. Combinations of the one or more types of signaling devices, including one or more check valves in combination with one or more other types of signaling devices may also be used.

FIG. 1 depicts a diagram of a fluid supply system in accordance with one aspect of the present invention. It is noted that the Figures describe the use of monitoring check valves and authorizing check valves. However, as set forth herein other signaling devices may be used in place of some or all of the check valves. Thus, the description of the system of the invention as set forth in FIGS. 1 and 2 should be understood to depict check valves as one example of a monitoring signaling device or authorizing signaling device as further set forth herein.

The preferred fluid supply system 10 described in FIG. 1 comprises main valve 20 having an inlet pressure sensor 22 and an outlet pressure sensor 24. The main valve 20 is operatively connected to a controller 26 that is capable of processing signals from each authorizing check valve 32. The supply network comprises main pipe 40 and distribution line pipes 42 and 44. The supply network shown in FIG. 1 is only an example of a supply network. Other configurations of one or more main pipes and one or more distribution lines are also contemplated by the present invention. What is important is the presence of at least the controller 26, the main valve 20 and the authorizing check valves 32. It should be understood that controller 26 can be in a single housing and/or distributed about one or more units so that one or more assemblies and/or functionalities therein can comprising controller 26.

Figure 2:
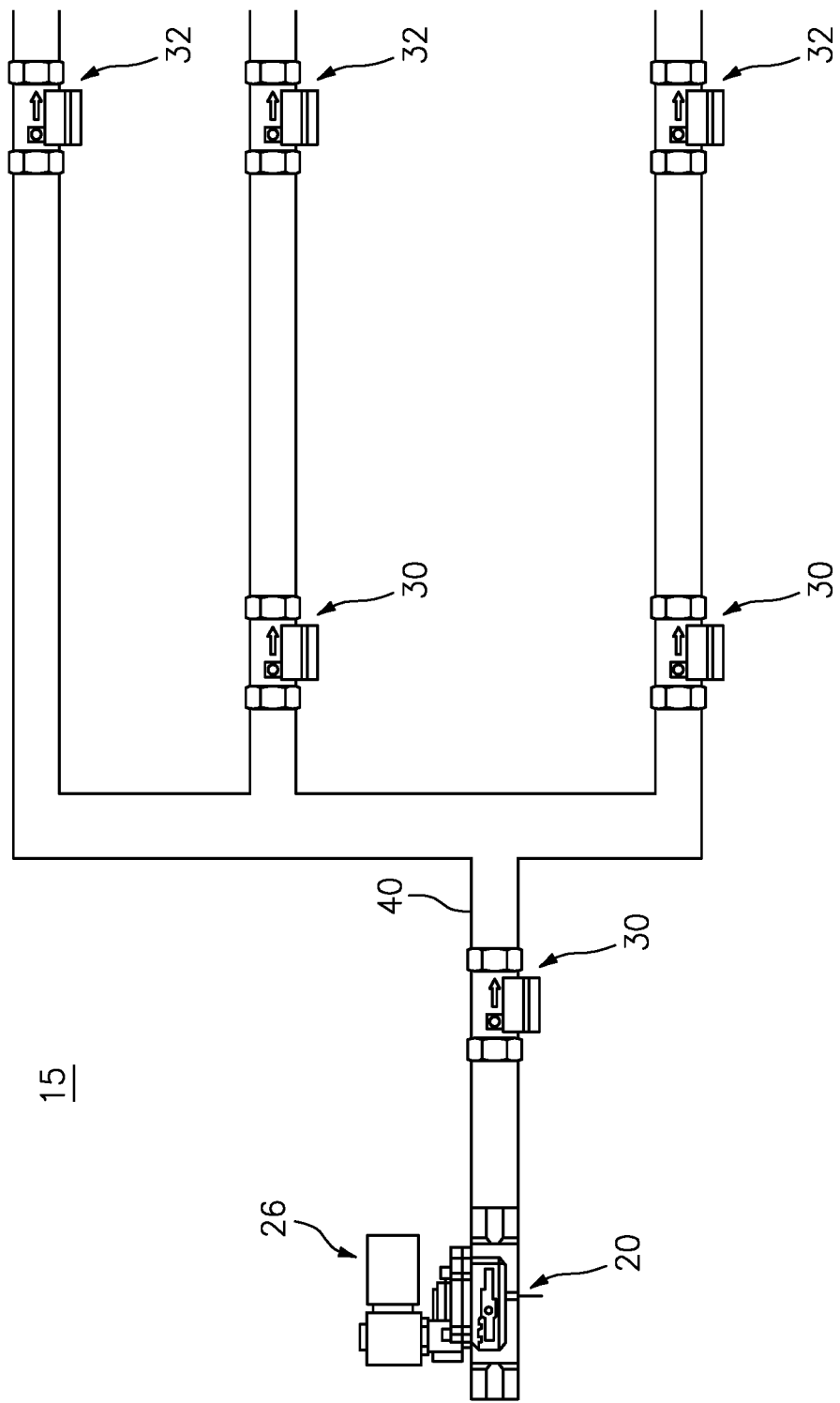
FIG. 2 depicts a diagram of a fluid supply system in accordance with another preferred embodiment of the present invention and including monitoring check valves to isolate source location of unauthorized fluid requests.

FIG. 2 depicts a view of a different fluid supply system 15 that also includes monitoring check valves 30. As shown in FIG. 2, in this embodiment, the fluid supply system 15 is also able to monitor unauthorized fluid requests. The monitoring check valves are positioned on the main pipe 40 and on one or more distribution lines. As described in FIG. 1, the programmable main valve 20 is operatively connected to a controller 26 that is capable of processing signals from each monitoring check valve 30 and each authorizing check valve 32.

The main valve 20 only opens upon a request of an authorized request for fluid to the controller 26 from one or more of the authorizing check valves 32. That is, the controller 26 receives information from the monitoring check valves 30 and the authorizing check valves 32, but only the authorizing check valves are programmed to request fluid from the controller 26.

Figure 3:
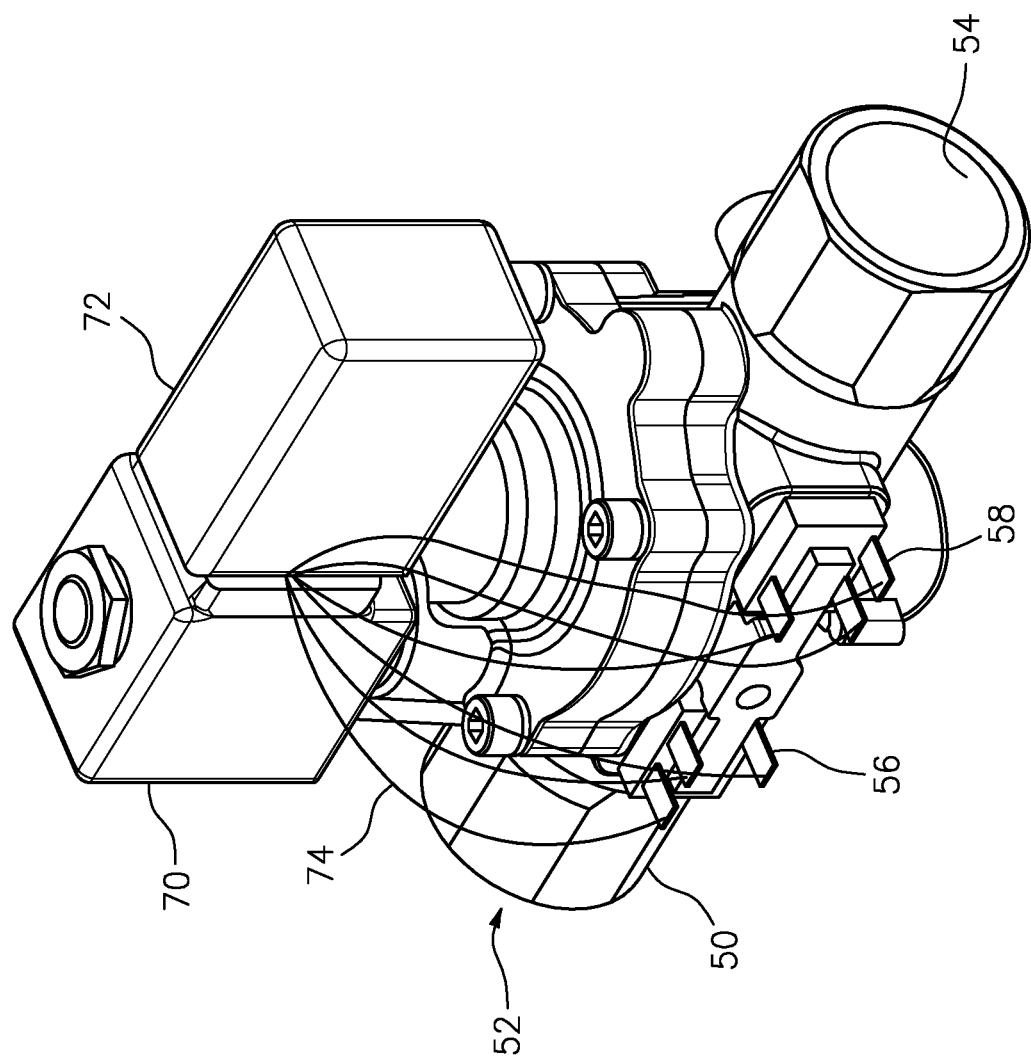
FIG. 3 depicts a view of a main programmable valve in accordance with a preferred embodiment of the present invention.
Figure 4:
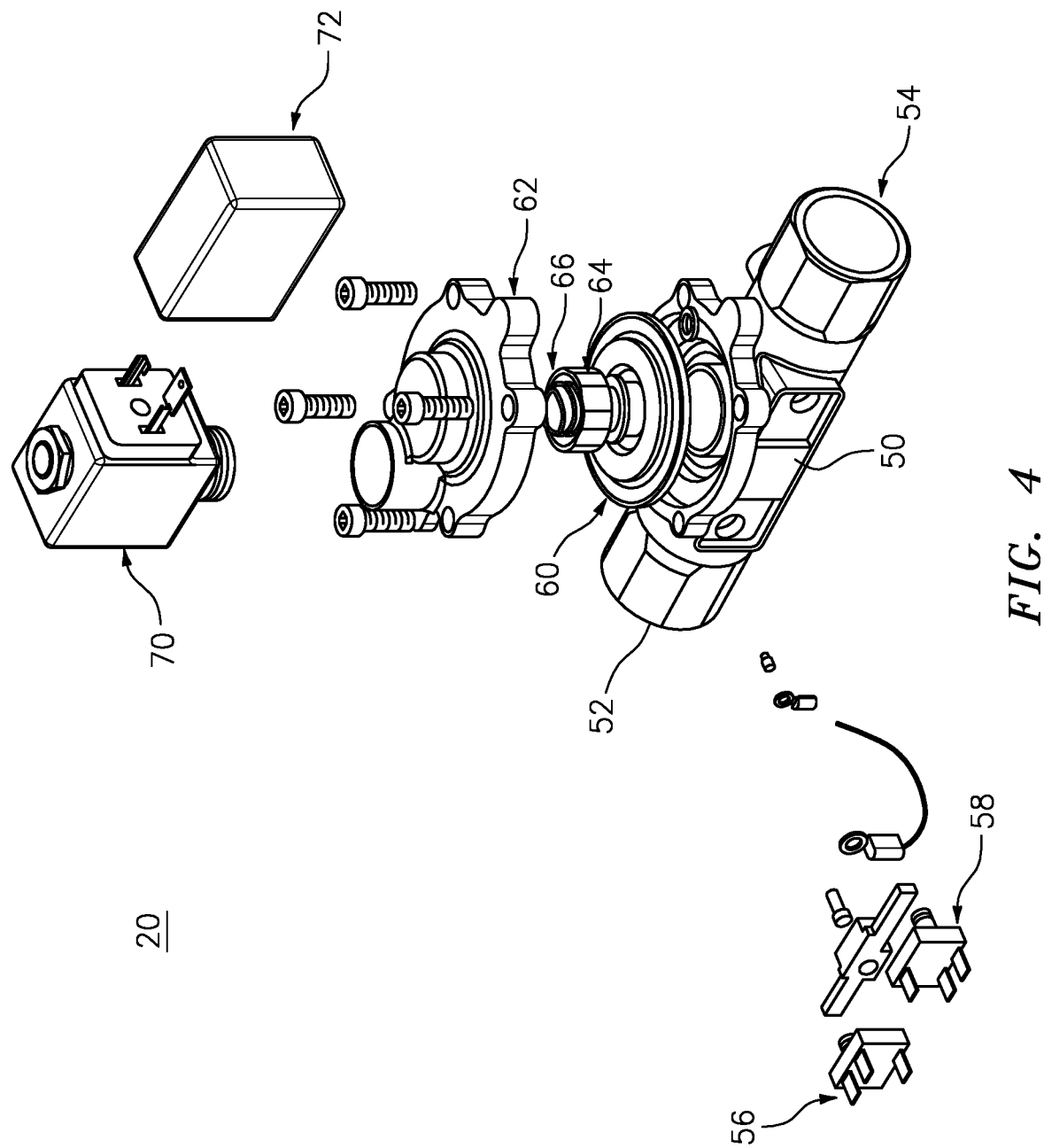
FIG. 4 depicts an exploded view of the main programmable valve of FIG. 3.

A preferred programmable main valve 20 is shown in FIGS. 3 and 4. Main body valve 50 comprises an inlet 52 and an outlet 54. Mounted on main body valve 50 is an inlet pressure sensor 56 and an outlet pressure sensor 58. The preferred main valve 20 shown in the figures is a diaphragm valve and further comprises a diaphragm 60 mounted on an upper port of the main body valve 50 that is held in place by a valve cover 62. Also included therein is a piston 64 disposed under the valve cover 62 that mates with an opening in the diaphragm 60 that is capable of being biased by spring 66 or other biasing means. In one embodiment, the controller 26 comprises an electro valve 70 is disposed in the valve cover 62 that is operatively connected with an RF device 72 that is capable of communicating with sensors operatively connected to monitoring check valves 30 and authorizing check valves 32. Wires 74 connect inlet pressure sensor 56 and outlet pressure sensor 58 with the controller 26.

Each of the authorized check valves and the monitoring check valves is registered to the system so that the controller 26 can preferably, but not necessarily, communicate with each of the authorized check valves 32 and the monitoring check valves 30.

Thus, in one embodiment, a user may program the controller 26 to recognize main valve 20, to recognize each monitoring check valve 30, and to recognize each authorizing check valve 32. The controller 26 may be preprogrammed with suitable values for pressure drop as well as cracking pressure of each monitoring check valve and each authorizing check valve as well as other suitable process conditions. However, it is also contemplated that a user may input their own information regarding process conditions based on their own particular needs.

The controller 26 also has the capability of being programmable to monitor specific data, compute specific data and take certain actions with regards to fluid flow within the system. This information may also be programmed by the user and will depend on the particular needs of the user.

For example, the outlets or taps may only be authorized for fluid flow at certain times (i.e., certain times of the day, certain days of the week, etc.). Thus, a request to the controller 26 for fluid by an authorizing check valve 32 at an unauthorized time will not result in a fluid release from the main valve 20. As another example, an authorizing signaling device may be associated with a kitchen sink or other similar device where it may be desirable to authorize flow of fluid for an authorized period of time, i.e., for a kitchen sink an authorized period of time may be 10 minutes or 15 minutes or 20 minutes, which would allow a user to turn water on/off multiple times during the authorized period while washing dishes. Thus, in this instance the controller 26 is programmed not only to recognize actual request for fluid from the authorizing signaling device but also to release fluid to the outlet or tap requesting the fluid through the authorizing signaling device for the authorized period. Another example of this is in a system where water conservation is desired. Thus, the system may desire to limit certain the duration of certain activities (i.e., showering or bathing) to conserve water and the authorized period may be set to a desired maximum time period for the activity.

It is also noted that the present invention does not act to prevent leak within the environment but monitors the system for changes in pressure at the monitoring check valves 30 and the authorizing check valves 32 to identify any leaks that may develop in the system, so they may be mitigated.

Figure 5:
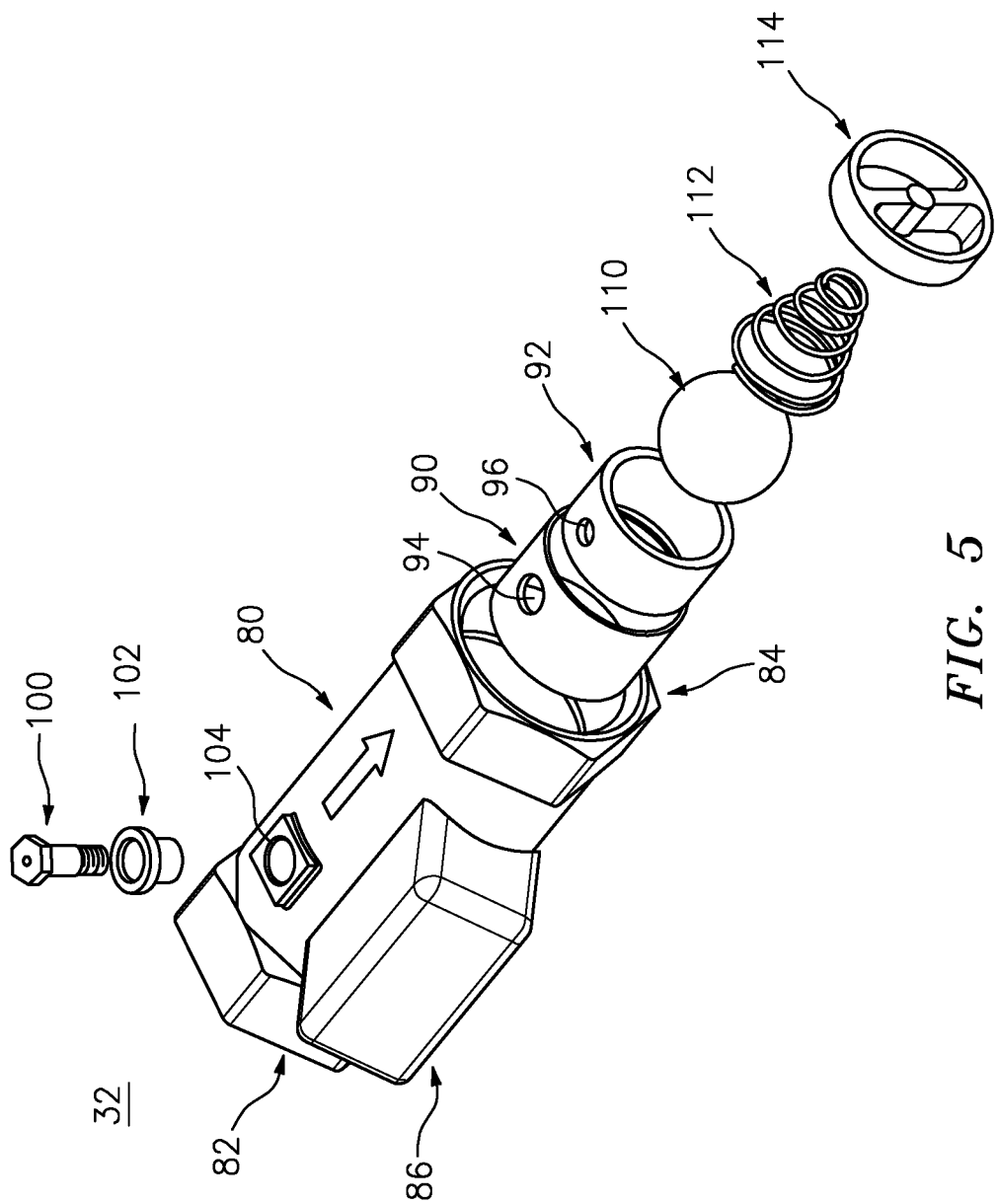
FIG. 5 depicts an exploded view of a check valve in accordance with a preferred embodiment of the present invention.

In one preferred embodiment, one or more of the monitoring signaling devices or one or more of the authorizing signaling devices may comprise a check valve. If used, these check valves may comprise spring loaded check valves as shown in FIG. 5. Spring loaded check valves are powered by flow and differential pressure with assistance from the spring pressure. The check valve seat divides the valve into upstream (inlet) and downstream (outlet) sides. A stopper or plunger rests inside the valve and can move so that one of its surfaces can rest against the valve seat. The position of the spring applies a constant pressure to hold the stopper or plunger in place against the valve seat, sealing the surfaces together. Fluid flow in the correct direction and at the right pressure overcomes the force of the spring and pushes the sealing surface of a stopper or plunger away from the seat, allowing flow to take place. When the upstream pressure drops low enough, the spring pushes the sealing surface of the stopper back against the sealing surface of the valve seat, closing the valve and preventing reverse flow.

As shown in FIG. 5, a spring valve that may be used as a monitoring signaling device or an authorizing signaling device may comprise a main body 80 having an inlet side 82 and an outlet side 84 for the flow of a fluid therethrough. A radio frequency device 86 having a unique signal code that can communicate with the controller 26 is operatively connected to the main body 80. Disposed within the main body 80 is an insulation ring 90 and a contact ring 92. The insulation ring 90 fits within a portion of the main body 80 and has a hole 94 in a surface thereof that is capable of mating with a corresponding hole 96 in the contact ring 92 that is disposed within the insulation ring 90. A connectivity pin 100 is positioned within pin insulator 102 and is threaded through a hole 104 in the main body 80 and then into the hole 94 in the insulation ring 90 and the hole 96 in the contact ring 92. The connectivity pin 100 extends beyond the length of the pin insulator 102 to make contact with the hole 96 in the contact ring 92. The connectivity pin 100 and the contact ring 92 are both composed of a conductive metal such as steel, while the pin insulator 102 and the insulation ring 90 are both composed of a non-conductive plastic.

A stopper 110 is disposed within the main body 80 and makes contact with the contact ring 92 to create a ground with the main body 80 and complete the circuit. The stopper 110 may be selected from the group consisting of a ball, a disc, a piston, or a poppet. In one embodiment, the stopper 110 is a ball. A spring or other biasing member 112 holds the stopper 110 in place and is in turn held in place by a retainer 114.

The stopper 110 is a movable element that moves in and out of electrical contact with the contact ring 92 in the main body 80. The stopper 110 must detach completely from the contact ring 92 to break contact. In other words, the check valve cannot be partially open/closed. The cracking pressure of the check valve is preferably within the range of less than about 2 psi, more preferably within the range of less than about 1 psi.

Sensors 122 (shown in FIGS. 6-8) may be connected to each monitoring check valve and to each authorizing check valve and monitor pressure (and/or other process conditions) within the environment. Thus, in one embodiment, the sensors monitor the pressure within the environment by monitoring the change in pressure across each of the monitoring check valves 30 and the authorizing check valves 32 so that the value of the pressure drop stays within a certain range. If the pressure drop is not within the prescribed range, a signal is sent to the main valve 20. While sensor 122 most preferably monitors pressure, in some embodiments, it may be preferable to monitor other process conditions instead of or in addition to pressure. For example, in some embodiments, it may also be desirable to monitor temperature, flow rate, fluid density, concentration of a contaminant, etc. depending on the complexity of the environment and the fluid being monitored.

Figure 6:
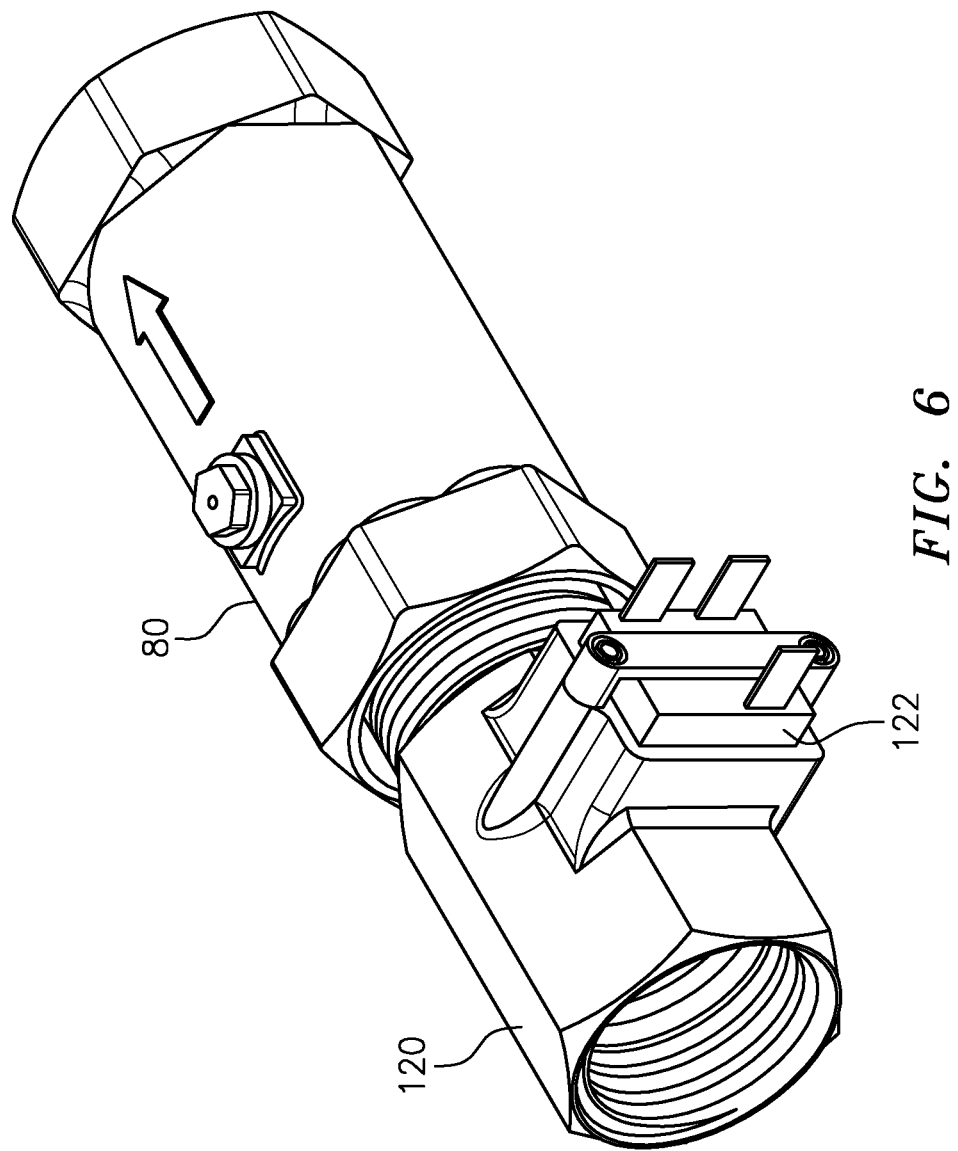
FIG. 6 depicts a view of a check valve having a pressure sensor mounted thereon in accordance with a preferred embodiment of the present invention.
Figure 7:
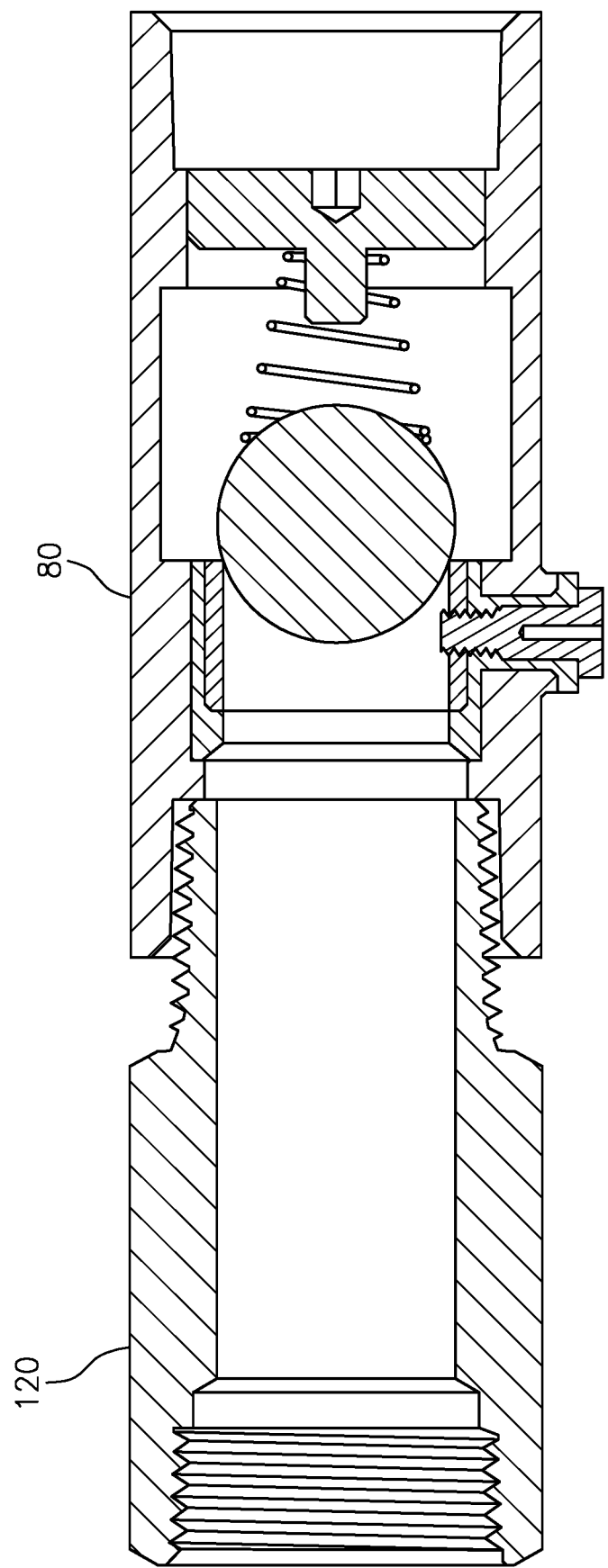
FIG. 7 depicts another view of the check valve of FIG. 6.
Figure 8:
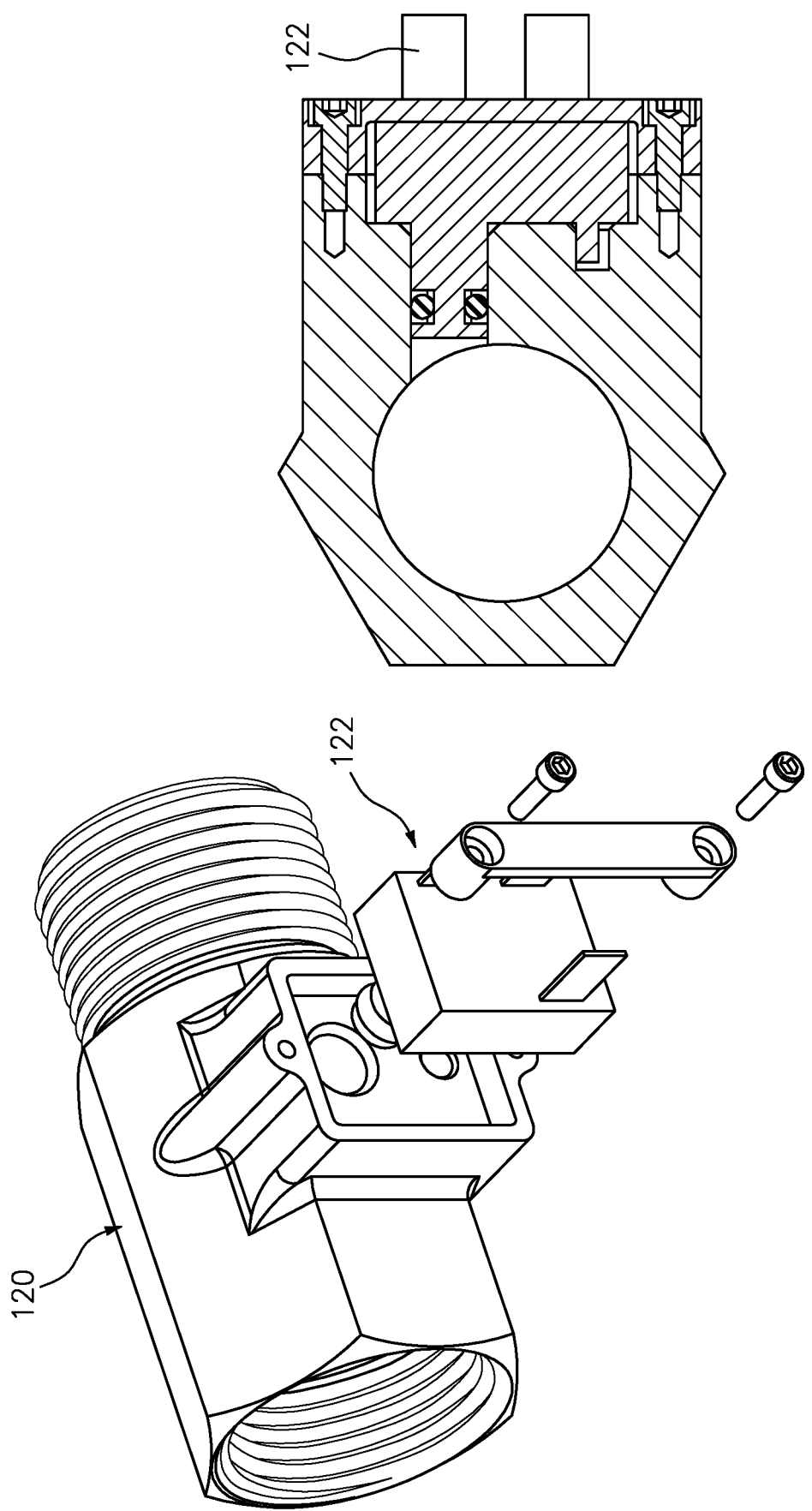
FIG. 8 depicts an exploded view of a portion of the check valve of FIG. 6.

FIGS. 6 and 7 depict a view of any one or more authorizing check valve 32 or any one or more monitoring check valve 30 that is joined with an auxiliary body 120 on an inlet side 82 of main body 80. The auxiliary body 120 comprises a sensor 122 for monitoring pressure. Radio frequency device 86 can communicate information regarding pressure drop to the programmable main valve 20. FIG. 8 is an exploded view of auxiliary body 120 comprising pressure sensor 122.

As described herein, each monitoring check valve and each authorizing check valve 32 generates a signal when it is closed and when it is open. The signal of "open" or "closed" is then processed by the controller 26 to determine the condition at the valve/signaling device that is sending the signal and/or in the case of an authorizing check valve, in particular, if the request is authorized.

The present invention is also directed to a method of controlling a flow of fluid into and within an environment.

In one preferred embodiment, the present invention relates generally to a method of controlling a flow of fluid in an environment, wherein the environment comprises a main valve positioned at an entry point, wherein the main valve permits fluid to be discharged into the environment upon receipt of an authorizing signal thereto, one or more authorizing signaling devices, wherein each authorizing signaling device (i) is associated with a respective outlet tap or valve from which fluid can be requested, (ii) is positioned intermediate the main valve and the respective outlet with which it is associated, and (iii) has a unique identifier associated therewith, wherein each authorizing signaling device is in fluid communication with the main valve, and a supply network of one or more lines, tubes and/or pipes, wherein the supply network of lines, tubes and/pipes permits the flow of fluid through the main valve, through the one or more authorizing signaling devices, and to each respective outlet associated with the one or more authorizing signaling devices, wherein each of the authorizing signaling devices and the main valve is in communication with a controller; the method comprising the steps of:

i) registering a unique identifier of the main valve with the controller;

ii) registering the unique identifier of each authorizing signaling device with the controller; and iii) programming the controller to receive signals from the main valve and the authorizing signaling devices, wherein the authorizing signaling device can authorize discharge of fluid to their respective outlet/tap valve upon initiation of a request from the authorizing check valve to the controller; and wherein the controller processes signals from each authorizing signaling device to control the flow of fluid within the environment.

In another preferred embodiment, the environment comprises one or more monitoring signaling devices positioned within the supply network of one or more lines, tubes and/or pipes and intermediate the main valve and an authorizing signaling device, wherein the fluid flows through the main valve, the one or more monitoring signaling devices and the authorizing signaling device; wherein the one or more monitoring signaling devices has a unique identifier associated therewith and comprises a sensor for monitoring a process condition associated therewith, wherein the one or more monitoring signaling devices is in fluid communication with the main valve, and wherein the receipt of a signal from the one or more monitoring signaling devices to the controller provides information to the controller regarding the process condition being monitored, the method further comprising the step of:

registering the unique signal code of the one or more monitoring signaling devices with the controller; and programming the controller to receive signals from the one or more monitoring signaling devices, wherein the one or more monitoring signaling devices cannot authorize a request for fluid from the controller.

In the present invention, the objectives as set forth herein are achieved because there will be no leaks of any consequence because the supply of fluid is always closed. The main valve only opens to allow fluid into the environment when there is an authorized request. Thus, fluid is not supplied if there is a "leak" request and the invention identifies any leak of consequence within the defined environment, accidental or otherwise.

The present invention also identifies unauthorized fluid demands that develop within the system and the specific area from which these demands originate within the environment. This will greatly facilitate the ability to troubleshoot the environment to locate the source of the unauthorized demand and allow for repair correction of such leak as may be needed.

Flow of water or other fluid into the environment through the main valve towards the monitoring signaling devices and the authorizing signaling devices only occurs when an authorized request for fluid is made by one or more of the authorizing signaling devices.

Finally, it should also be understood that the following claims are intended to cover all of the generic and specific features of the invention described herein and all statements of the scope of the invention that as a matter of language might fall there between.

What is claimed is:

1. A system for monitoring and controlling a flow of fluid in an environment, the system comprising:
   a. a main valve positioned at an entry point of the environment, wherein the main valve permits fluid to be discharged into the environment upon receipt of an authorizing signal thereto;
   b. one or more authorizing signaling devices, wherein at least one of the one or more authorizing signaling devices (i) is associated with a respective outlet tap or valve from which fluid can be requested, (ii) is positioned intermediate the main valve and the respective outlet tap or valve with which it is associated, and (iii) has a unique identifier associated therewith;
   c. a controller in communication with the at least one of the one or more authorizing signaling devices, wherein the at least one of the one or more authorizing signaling devices can request authorization from the controller to discharge fluid to the respective outlet tap or valve with which it is associated;
   d. a supply network of one or more lines, tubes and/or pipes in the environment, wherein the supply network of one or more lines, tubes and/or pipes permit the flow of fluid through the main valve through the at least one or more of the authorizing signaling devices and to the respective outlet tap or valve associated with the at least one of the one or more authorizing signaling devices;

wherein the controller receives an authorization request from the at least one of the one or more authorizing signaling devices, determines whether the requested authorization from the at least one of the one or more authorizing signaling devices is an authorized request, and provides the authorizing signal to the main valve to permit the flow of fluid through the main valve upon a determination by the controller that the authorization request from the at least one of the one or more authorizing signaling devices is the authorized request, at least one monitoring signaling device positioned within the supply network of one or more lines, tubes and/or pipes and intermediate the main valve and the at least one of the one or more authorizing signaling devices, wherein the fluid flows through the main valve, the at least one monitoring signaling device and the at least one of the one or more authorizing signaling devices;

wherein the at least one monitoring signaling device has a unique identifier associated therewith and comprises a sensor for monitoring a process condition associated therewith;

wherein the receipt of a signal from the at least one monitoring signaling device to the controller provides information to the controller regarding the process condition being monitored; and wherein the at least one monitoring signaling device cannot authorize a request for fluid from the controller.

2. The system according to claim 1, wherein the controller makes the determination that the authorization request from the at least one of the one or more authorizing signaling devices is the authorized request.

3. The system according to claim 1, wherein the controller and the main valve are integrated into a programmable main valve assembly.

4. The system according to claim 1, wherein the controller and the main valve are physically separate assemblies.

5. The system according to claim 4, wherein the controller is located remotely from the main valve.

6. The system according to claim 1, wherein the process condition monitored by the sensor is pressure, temperature, flow rate, fluid density, or combinations of one or more of the foregoing.

7. The system according to claim 6, wherein the process condition monitored by the sensor is pressure, wherein the sensor monitors pressure drop across the at least one monitoring signaling device to within a prescribed range, wherein if the pressure drop across the at least one monitoring signaling device is outside the prescribed range, a signal is sent by the at least one monitoring signaling device to the controller.

8. The system according to claim 1, wherein one or more of the authorizing signaling devices comprises a sensor for monitoring a process condition associated therewith.

9. The system according to claim 8, wherein the process condition monitored by the sensor is pressure, wherein the sensor monitors pressure drop across the one or more of the authorizing signaling devices to within a prescribed range, wherein if the pressure drop across any of the one or more authorizing signaling devices is outside the prescribed range, a signal is sent by the at least one authorizing signaling device to the controller.

10. A method of at least one of monitoring and controlling the flow of fluid in the environment using the system as claimed in claim 1, comprising the steps of:

receiving, by the controller, the authorization request sent from the at least one of the one or more authorizing signaling devices, determining, by the controller, whether the requested authorization from the at least one of the one or more authorizing signaling devices is the authorized request, providing the authorizing signal to the main valve to permit the flow of fluid through the main valve upon said determination by the controller that the authorization request from the at least one of the one or more authorizing signaling devices is the authorized request.

11. A method of at least one of monitoring and controlling the flow of fluid in the environment using the system as claimed in claim 1, comprising the steps of receiving, by the controller, the signal from the at least one monitoring signaling device;

determining, by the controller, the process condition being monitored; and sending a further signal, by the controller, so that the process condition can be evaluated.

12. A system for monitoring and controlling a flow of fluid in an environment, the system comprising:

a. a main valve positioned at an entry point of the environment, wherein the main valve permits fluid to be discharged into the environment upon receipt of an authorizing signal thereto;

b. one or more authorizing signaling devices, wherein at least one of the one or more authorizing signaling devices (i) is associated with a respective outlet tap or valve from which fluid can be requested, (ii) is positioned intermediate the main valve and the respective outlet tap or valve with which it is associated, and (iii) has a unique identifier associated therewith;

c. a controller in communication with the at least one of the one or more authorizing signaling devices, wherein the at least one of the one or more authorizing signaling devices can request authorization from the controller to discharge fluid to the respective outlet tap or valve with which it is associated;

d. a supply network of one or more lines, tubes and/or pipes in the environment, wherein the supply network of one or more lines, tubes and/or pipes permit the flow of fluid through the main valve through the at least one or more of the authorizing signaling devices and to the respective outlet tap or valve associated with the at least one of the one or more authorizing signaling devices;

wherein the controller receives an authorization request from the at least one of the one or more authorizing signaling devices, determines whether the requested authorization from the at least one of the one or more authorizing signaling devices is an authorized request, and provides the authorizing signal to the main valve to permit the flow of fluid through the main valve upon a determination by the controller that the authorization request from the at least one of the one or more authorizing signaling devices is the authorized request, at least one monitoring signaling device positioned within the supply network of one or more lines, tubes and/or pipes and intermediate the main valve and the at least one of the one or more authorizing signaling devices, wherein the fluid flows through the main valve, the at least one monitoring signaling device and the at least one of the one or more authorizing signaling devices;

wherein the at least one monitoring signaling device has a unique identifier associated therewith and comprises a sensor for monitoring a process condition associated therewith, and wherein the receipt of a signal from the at least one monitoring signaling device to the controller provides information to the controller regarding the process condition being monitored; and wherein the controller will not authorize a request for fluid from the at least one monitoring signaling device.

13. A system for monitoring and controlling a flow of fluid in an environment, the system comprising:

a. a main valve positioned at an entry point of the environment, wherein the main valve permits fluid to be discharged into the environment upon receipt of an authorizing signal thereto;

b. one or more authorizing signaling devices, wherein at least one of the one or more authorizing signaling devices (i) is associated with a respective outlet tap or valve from which fluid can be requested, (ii) is positioned intermediate the main valve and the respective outlet tap or valve with which it is associated, and (iii) has a unique identifier associated therewith;

c. a controller in communication with the at least one of the one or more authorizing signaling devices, wherein the at least one of the one or more authorizing signaling devices can request authorization from the controller to discharge fluid to the respective outlet tap or valve with which it is associated;

d. a supply network of one or more lines, tubes and/or pipes in the environment, wherein the supply network of one or more lines, tubes and/or pipes permit the flow of fluid through the main valve through the at least one or more of the authorizing signaling devices and to the respective outlet tap or valve associated with the at least one of the one or more authorizing signaling devices;

wherein the controller receives an authorization request from the at least one of the one or more authorizing signaling devices, determines whether the requested authorization from the at least one of the one or more authorizing signaling devices is an authorized request, and provides the authorizing signal to the main valve to permit the flow of fluid through the main valve upon a determination by the controller that the authorization request from the at least one of the one or more authorizing signaling devices is the authorized request, wherein the at least one of the one or more of the authorizing signaling devices comprises a check valve, wherein the check valve comprises:

i. a main body having an inlet side and an outlet side for a flow of fluid therethrough, ii. an insulation ring disposed within a portion of the main body and a contact ring disposed within the insulation ring, wherein the insulation ring, the contact ring and the main body each have a hole in a surface therein that align to receive a connectivity pin;

iii. a stopper disposed within the main body that is capable of making contact with the contact ring to create a ground with the main body and complete a circuit, wherein the stopper is held in place by a biasing member and a retainer; and iv. a radio frequency device having a unique signal code that can communicate with a radio frequency device of the controller, the radio frequency device being operatively connected to the main body;

wherein when the stopper detaches from the contact ring, the radio frequency device communicates the unique signal code to the controller.

14. A system for monitoring and controlling a flow of fluid in an environment, the system comprising:
   a. a main valve positioned at an entry point of the environment, wherein the main valve permits fluid to be discharged into the environment upon receipt of an authorizing signal thereto;
   b. one or more authorizing signaling devices, wherein at least one of the one or more authorizing signaling devices (i) is associated with a respective outlet tap or valve from which fluid can be requested, (ii) is positioned intermediate the main valve and the respective outlet tap or valve with which it is associated, and (iii) has a unique identifier associated therewith;
   c. a controller in communication with the at least one of the one or more authorizing signaling devices, wherein the at least one of the one or more authorizing signaling devices can request authorization from the controller to discharge fluid to the respective outlet tap or valve with which it is associated;
   d. a supply network of one or more lines, tubes and/or pipes in the environment, wherein the supply network of one or more lines, tubes and/or pipes permit the flow of fluid through the main valve through the at least one or more of the authorizing signaling devices and to the respective outlet tap or valve associated with the at least one of the one or more authorizing signaling devices;
   wherein the controller receives an authorization request from the at least one of the one or more authorizing signaling devices, determines whether the requested authorization from the at least one of the one or more authorizing signaling devices is an authorized request, and provides the authorizing signal to the main valve to permit the flow of fluid through the main valve upon a determination by the controller that the authorization request from the at least one of the one or more authorizing signaling devices is the authorized request,
   at least one monitoring signaling device positioned within the supply network of one or more lines, tubes and/or pipes and intermediate the main valve and the at least one of the one or more authorizing signaling devices, wherein the fluid flows through the main valve, the at least one monitoring signaling device and the at least one of the one or more authorizing signaling devices;
   wherein the at least one monitoring signaling device has a unique identifier associated therewith and comprises a sensor for monitoring a process condition associated therewith, and
   wherein the receipt of a signal from the at least one monitoring signaling device to the controller provides information to the controller regarding the process condition being monitored; and
   wherein one or more of the monitoring signaling devices comprises a check valve, wherein the check valve comprises:
   e. a main body having an inlet side and an outlet side for a flow of fluid therethrough,
   f. an insulation ring disposed within a portion of the main body and a contact ring disposed within the insulation ring, wherein the insulation ring, the contact ring and the main body each have a hole in a surface therein that align to receive a connectivity pin;
   g. a stopper disposed within the main body that is capable of making contact with the contact ring to create a ground with the main body and complete a circuit, wherein the stopper is held in place by a biasing member and a retainer; and
   h. a radio frequency device having a unique signal code that can communicate with a radio frequency device of the controller, the radio frequency device being operatively connected to the main body;
   wherein when the stopper detaches from the contact ring, the radio frequency device communicates the unique signal code to the controller.

15. A method of controlling a flow of fluid in an environment, wherein the environment comprises a main valve positioned at an entry point, wherein the main valve permits fluid to be discharged into the environment upon receipt of an authorizing signal, thereto, one or more authorizing signaling devices, wherein the one or more authorizing signaling devices (i) is associated with a respective outlet tap or valve from which fluid can be requested, (ii) is positioned intermediate the main valve and the respective outlet tap or valve with which it is associated, and (iii) has a unique identifier associated therewith, wherein the one or more authorizing signaling devices is in fluid communication with the main valve, and a supply network of one or more lines, tubes and/or pipes, wherein the supply network of lines, tubes and/pipes permits the flow of fluid through the main valve, through the one or more authorizing signaling devices, and to the respective outlet tap or valve associated with the one or more authorizing signaling devices, wherein the one or more authorizing signaling devices and the main valve is in communication with a controller;
   the method comprising the steps of:
   registering a unique identifier of the main valve with the controller;
   registering the unique identifier of each authorizing signaling device with the controller; and
   programming the controller to receive signals from at least the authorizing signaling devices and to send signals to at least the main valve,
   wherein the authorizing signaling device can request discharge of fluid to the respective outlet tap or valve upon initiation of a request from the one or more authorizing signal devices to the controller; and
   wherein the controller processes signals from the one or more authorizing signaling devices to control the flow of fluid within the environment; and
   wherein the environment comprises one or more monitoring signaling devices positioned within the supply network of one or more lines, tubes and/or pipes and intermediate the main valve and the one or more authorizing signaling devices, wherein the fluid flows through the main valve, the one or more monitoring signaling devices and the one or more authorizing signaling devices; wherein the one or more monitoring signaling devices has a unique identifier associated therewith and comprises a sensor for monitoring a process condition associated therewith, wherein the one or more monitoring signaling devices is in fluid communication with the main valve, and wherein the receipt of a signal from the one or more monitoring signaling devices by the controller provides information to the controller regarding the process condition being monitored, the method further comprising the step of:
   a. registering the unique signal code of the one or more monitoring signaling devices with the controller; and
   b. programming the controller to receive signals from the one or more monitoring signaling devices, wherein the one or more monitoring signaling devices cannot authorize a request for fluid from the controller.

* * * * *